INVENTOR
WAYNE R. HOWARD
BY *Robert H. Johnson*
ATTORNEY

United States Patent Office 3,440,902
Patented Apr. 29, 1969

3,440,902
REVERSIBLE HYDRODYNAMIC TORQUE CONVERTER
Wayne R. Howard, Jackson, Mich., assignor to Clark Equipment Company, a corporation of Michigan
Filed Oct. 16, 1967, Ser. No. 675,536
Int. Cl. F16h *47/04*
U.S. Cl. 74—718     10 Claims

ABSTRACT OF THE DISCLOSURE

A reversible hydrodynamic torque converter which has a pair of turbines that are axially movable and alternatively positionable in the fluid flow path. The turbines are connected to the output shaft by separate gear sets which drive the output shaft in opposite directions of rotation.

Background of the invention

The field of art to which this invention relates includes machine elements, and more specifically to hydrodynamic torque converters combined with gear trains.

The principal object of my invention is to provide a hydrodynamic torque converter in conjunction with a reversing gear train which is actuatable to operate in either forward or reverse without the use of a clutch.

Summary of the invention

In carrying out my invention in a preferred embodiment there is provided a hydrodynamic torque converter having a pair of turbines and an output shaft. One of the turbines is connected to the output shaft by a gear train so that the output shaft is driven in one direction of rotation and the other turbine is connected to the output shaft by another gear train so that the output shaft is driven in the opposite direction of rotation. The turbines, are movable axially and can be alternatively disposed in driving position in the fluid flow circuit. In a modification of my invention the support for one of the turbines is located upstream from the other turbine and both turbines are movable axially relative to the gear sets.

The above and other objects, features and advantages of my invention will be more readily apparent when the detailed description is taken in conjunction with the drawing.

Description of the preferred embodiment

Figure 1:
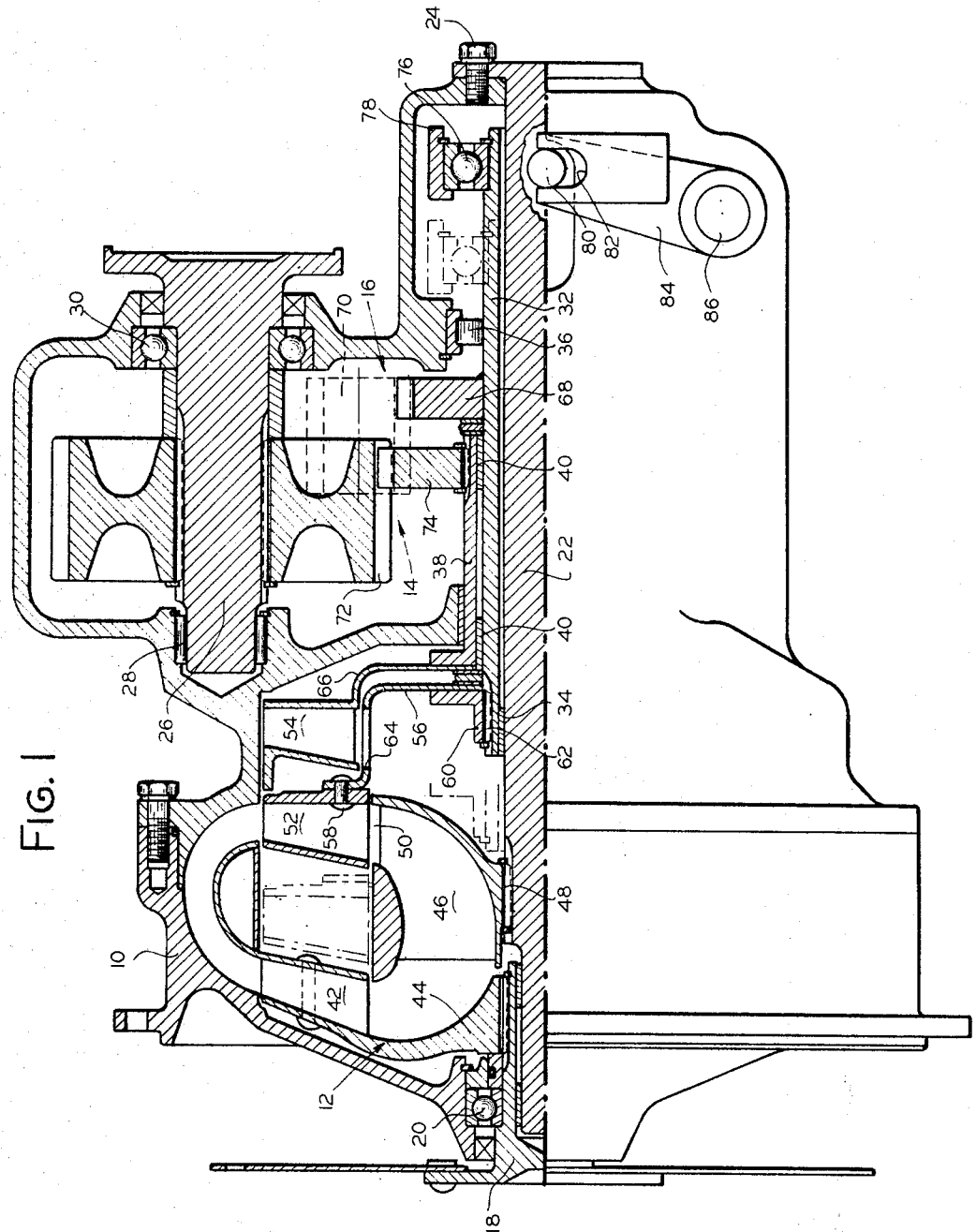
FIGURE 1 is a longitudinal section of a preferred embodiment of my invention.
Figure 2:
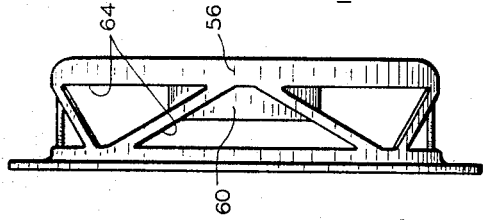
FIGURE 2 shows in detail the turbine support member.

Referring now to FIGS. 1 and 2, reference numeral 10 denotes generally a housing in which a hydrodynamic torque converter 12 and a pair of gear sets 14 and 16 are disposed. Also disposed in housing 10 is an input shaft 18 which is rotatably journaled in a bearing 20, a central support 22 which is partially telescoped within shaft 18 and fixed to housing 10 by means of a plurality of machine screws 24 and an output shaft 26 which is journaled for rotation in housing 10 by means of bearings 28 and 30.

A sleeve shaft 32 is disposed coaxially with support 22 and is journaled for rotation at one end by a bushing 34 and is journaled for rotation at the other end by a bearing 36. Disposed coaxially with sleeve shaft 32 is another sleeve shaft 38 which is mounted for rotation upon sleeve shaft 32 by means of a pair of bushings 40. The purpose of shafts 32 and 38 will be explained in detail hereinafter.

Torque converter 12 includes a bladed impeller wheel 42 which is connected to input shaft 18 by means of a support 44 and a bladed reactor wheel 46 which is fixed to support 22 by means of a splined connection 48. Impeller 42 and reactor 46 form a portion of a generally race-track shaped toroidal chamber 50. Torque converter 12 also includes a pair of bladed turbine wheels 52 and 54 which are selectively disposable to form a portion of toroidal chamber 50. Torque converter 12 generally has toroidal chamber 50 filled with fluid and transmits power from impeller 42 to either turbine 52 or 54 by circulating oil around toroidal chamber 50 as is well known in the art.

Turbine 52 is connected to a dish shaped support 56 by any suitable means such as rivets 58. Also connected to support 56 is a bracket 60 which is generally U-shaped in cross section and has a splined connection 62 with sleeve shaft 32. At this point it will be seen that turbine 52 is connected to shaft 32 for conjoint rotation and axial movement therewith. Support 56 also has a plurality of openings 64 therein, the purpose of which will be explained shortly.

Turbine 54 has integral therewith a support 66 which is connected to shaft 38 by any suitable means, such as welding, to provide for conjoint rotation of turbine 54 with shaft 38 and axial movement therewith.

As is conventional in this type of torque converter the fluid flow in toroidal chamber 50 is from impeller 42 past either turbine 52 or 54, depending upon which one is disposed in toroidal chamber 50 and then past reactor 46. Consequently, when turbine 54 is disposed to form a portion of toroidal chamber 50 support 56 is located downstream of turbine 54 so that fluid flow is through turbine 54 and then through openings 64. Also turbines 52 and 54 are substantially identical and both rotate in the same direction of rotation when driving.

Connected to shaft 32 by any suitable means, such as welding for conjoint rotation therewith is a gear 68 which meshes with an idler gear 70 that is rotatably journaled for rotation in housing 10. Idler gear 70 in turn meshes with a gear 72 which is splined to output shaft 26 for conjoint rotation therewith. Also, a gear 74 is splined to shaft 38 for conjoint rotation therewith and meshes with gear 72. At this point it will be seen that by virtue of gear set 16 that output shaft 26 rotates in the same direction as shaft 32 and by virtue of gear set 14 output shaft 26 rotates in the direction opposite from the rotation of shaft 38.

Shaft 32 is shiftable axially from the position shown in FIG. 1 where turbine 52 is disposed to form a portion of toroidal chamber 50 and is in the fluid flow path to an intermediate position in which neither turbine 52 nor turbine 54 is in the fluid flow path and to a position in which turbine 54 is disposed to form a portion of toroidal chamber 50 and is in the fluid flow path. Connected to shaft 32 at one end thereof by means of a ball bearing 76 is a ring 78 which has a pair of outwardly extending pins 80 integral therewith, only one of which can be seen. Each pin 80 is engaged by a slot 82 in different ones of a pair of arms 84 which are mounted for pivotal movement on a shaft 86 journaled in housing 10. Thus, the operator can shift shafts 32 and 38 axially by pivoting arms 84.

In operation, assuming that turbine 52 is disposed as shown in FIG. 1, turbine 52 is being driven, and thus drives output shaft 26 in the same direction of rotation through gear set 16. Now, if the operator desires to interrupt power flow through the assembly, this can be accomplished by shifting turbine 52 slightly toward the left, as viewed in FIG. 1, so that turbine 52 is disposed out of the fluid flow but turbine 54 has not yet been moved into the fluid flow in toroidal chamber 50. Under this condition neither turbine 52 nor turbine 54 would be driven by the circulation of fluid in toroidal chamber 50. If the operator desires to drive output shaft 26 in the opposite direction of rotation he shifts shafts 32 and 38 further toward the left so that turbine 54 is disposed in the flow of fluid circulating in the toroidal chamber 50 so that turbine 54 is being driven. When this occurs output shaft 26 rotates in the opposite direction of rotation of turbine 54 due to the arrangement of gear set 14.

At this point it will be seen that I have provided a simple reversing hydrodynamic torque converter which does not require the operation of any clutches or brakes to achieve reversal or neutral.

Figure 3:
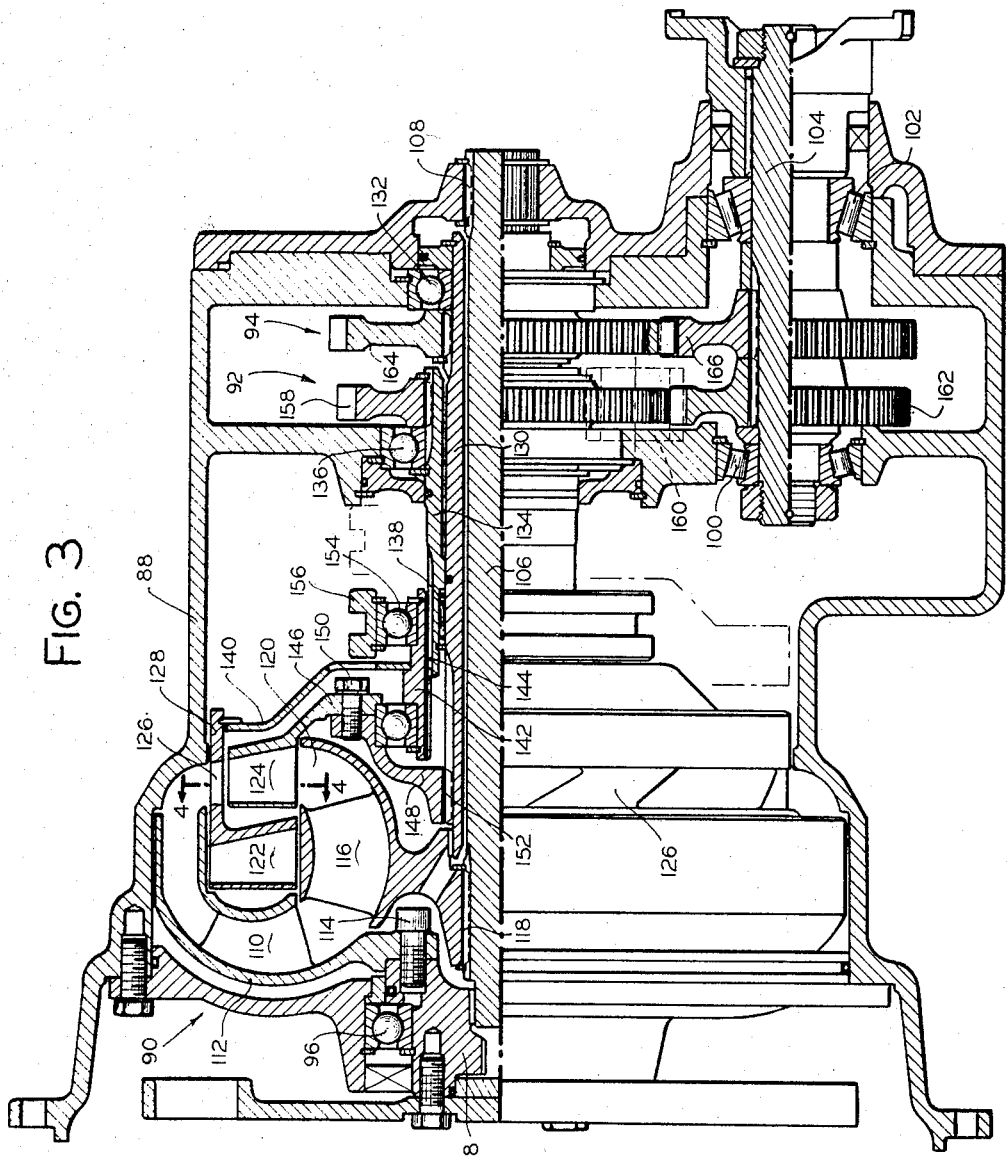
FIG. 3 is a longitudinal section of a modification of my invention.
Figure 4:
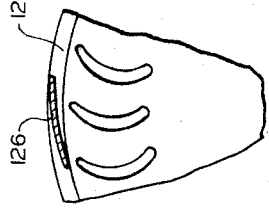
FIGURE 4 is a fragmentary cross-section taken along line 4—4 in FIG. 3.

Referring now to FIGS. 3 and 4, the second embodiment of my invention will be described. Reference numeral 88 shows generally a housing in which a hydrodynamic torque converter 90 and a pair of gear sets 92 and 94 are disposed. Journaled for rotation in housing 88 by means of a ball bearing 96 is an input shaft 98. Also journaled for rotation in housing 88 by means of bearings 100 and 102 is an output shaft 104. Finally, a stationary support 106 is partially telescoped in input shaft 98 and is splined to housing 88 at 108.

Torque converter 90 includes a bladed impeller wheel 110 connected to input shaft 98 by means of a dished support 112 which is fastened to input shaft 98 by means of a plurality of machine screws 114. Torque converter 90 also includes a bladed reactor wheel 116 which is fixed to stationary support 106 by means of a splined connection 118. Impeller 110 and reactor 116 form a portion of a toroidal chamber 120 in which fluid is circulated as is conventional in torque converters. Torque converter 90 also includes a pair of bladed turbine wheels 122 and 124 which are movable axially into or out of fluid flow path in toroidal chamber 120 and forming a portion of toroidal chamber 120 when disposed in the path of fluid flow. Rotation of impeller 110 causes fluid to pass through either turbine 122 or 124, depending upon which one is disposed in the path of fluid flow and then pass through reactor 116. Since turbines 122 and 124 are substantially identical they both rotate in the same direction when driving.

Connected to turbine 122 by means of a plurality of spaced spokes 126 is a ring 128. Spokes 126 are streamlined and are disposed so as to present a minimum amount of interference with the fluid flow entering turbine 124.

Disposed coaxially with support 106 is a sleeve shaft 130 which is journaled at one end for rotation in housing 88 by means of a bearing 132. Disposed coaxially of and outwardly of the sleeve shaft 130 is another sleeve shaft 134 which is journaled for rotation adjacent one end thereof in housing 88 by a bearing 136 and at the other end thereof has a bearing 138 disposed between it and shaft 130.

An annular connecting member 140 is connected at one end to ring 128 and is connected at the other end to a sleeve shaft 142 which has a sliding splined connection 144 with sleeve shaft 134, whereby turbine 122 is connected to sleeve shaft 134 for conjoint rotation therewith. Similarly, turbine 124 has integral therewith a connecting member 146 to which another connecting member 148 is secured by means of plurality of machine screws 150. Member 148 has a sliding splined connection with shaft 152, whereby shaft 130 is connected to turbine 124 for conjoint rotation therewith.

Connected to shaft 142 by means of a bearing 154 is an actuator ring 156 which is adapted to be engaged by a pin on a lever controlled by the operator so that turbines 122 and 124 can be shifted axially into and out of the path of fluid flow in toroidal chamber 120.

As was mentioned earlier, a gear set 92 is disposed in housing 88. This gear set includes a gear 158 which is splined to shaft 134 for rotation therewith and which meshes with an idler gear 160, idler gear 160 meshing with a gear 162 splined to output shaft 104 for rotation therewith. Thus, output shaft 104 can be driven by turbine 122 through gear set 92 in the same direction of rotation as shaft 134 and, of course, turbine 122. Gear set 94 includes a gear 164 splined to shaft 130 for rotation therewith and which meshes with a gear 166 splined to output shaft 104 for rotation therewith, whereby output shaft 104 is driven by turbine 124 through gear set 94 in the opposite direction of rotation of shaft 130.

In operation, by shifting turbines 122 and 124 axially into or out of the path of fluid flow in toroidal chamber 120 it is possible to selectively either drive turbine 122 or turbine 124 or by disposing turbines 122 and 124 intermediate their driving positions in toroidal chamber 120 a neutral position is provided since the fluid in the toroidal chamber cannot impinge on the blades of either turbine. Thus, in order to condition the torque converter for forward drive the turbine 122 is disposed in the path of fluid flow in toroidal chamber 120 so that it is driven, thereby driving output shaft 104 through gear set 92. In order to reverse the drive of output shaft 104 turbine 122 and 124 are shifted axially toward the left to the position shown in FIG. 3 so that turbine 124 is being driven, whereby output shaft 104 is driven by turbine 124 through gear set 94.

While only two embodiments of my invention have been described in detail, it is understood that the descriptions are for the purposes of illustration only and that my invention is subject to various modifications, changes and rearrangements of structure without departing from the scope of my invention. Consequently, the limits of my invention should be determined from the following appended claims.

I claim:

1. A hydrodynamic torque converter comprising an output shaft, an impeller, a reactor, the said impeller and reactor cooperating to form part of a toroidal chamber, the said impeller being operative to circulate fluid in the said toroidal chamber, first and second turbines alternatively disposable to form part of the said toroidal chamber, first means for connecting the said first turbine to the said output shaft, and second means for connecting the said second turbine to the said output shaft, one of the said connecting means being operative to connect the associated turbine and the said output shaft so that both rotate in the same direction and the other of the said connecting means being operative to connect the associated turbine and the said output shaft so that both rotate in opposite directions.

2. A hydrodynamic torque converter as set forth in claim 1 wherein the said first connecting means has a plurality of openings therein in order to permit fluid circulation in the said toroidal chamber when the said second turbine is disposed to form part of the said toroidal chamber and the said first turbine is disposed inwardly of the said toroidal chamber.

3. A hydrodynamic torque converter as set forth in claim 1 wherein the said first connecting means continuously connects the said first turbine to the said output shaft and the said second connecting means continuously connects the said second turbine to the said output shaft.

4. A hydrodynamic torque converter as set forth in claim 1 wherein the said one connecting means includes a first gear in mesh with a second gear, the said second gear meshing with a third gear fixed to the said output shaft and the said other connecting means includes a fourth gear in mesh with the said third gear.

5. A hydrodynamic torque converter as set forth in claim 1 wherein the said one connecting means includes a first rotatable shaft and a first gear connected to the said first shaft for rotation therewith and the said other connecting means includes a second rotatable shaft and a second gear connected to the said second shaft for rotation therewith, the said first shaft being telescoped in the said second shaft.

6. A hydrodynamic torque converter as set forth in claim 5 wherein the said shaft and gears are movable axially jointly.

7. A hydrodynamic torque converter as set forth in claim 6 wherein the said first connecting means includes a dish shaped member connected to the said first turbine and the said first shaft, the said member having a plurality of openings therein.

8. A hydrodynamic torque converter as set forth in claim 5 wherein the said turbines are movable axially relative to the said shafts and gears.

9. A hydrodynamic torque converter as set forth in claim 1 wherein the said first connecting means includes an annular support member connected to the said first turbine, the said support member having a portion with openings therein disposable in the said toroidal chamber upstream of the said second turbine.

10. A hydrodynamic torque converter as set forth in claim 1 wherein the said first connecting means includes an annular support member connected to the said first turbine, and said support member having a portion with openings therein disposable in the said toroidal chamber downstream of the said second turbine.

References Cited

UNITED STATES PATENTS

| | | | |
|---|---|---|---|
| 1,298,990 | 4/1919 | Mason | 60—54 X |
| 1,773,985 | 8/1930 | Fraser | 60—54 |
| 1,993,918 | 3/1935 | Campbell | 60—54 |
| 2,251,972 | 8/1941 | Banner | 60—54 |
| 3,280,655 | 10/1966 | Jandasek | 60—54 X |
| 3,306,131 | 2/1967 | Eaton et al. | 74—718 |

DONLEY J. STOCKING, *Primary Examiner.*

THOMAS C. PERRY, *Assistant Examiner.*

U.S. Cl. X.R.

74—732; 60—54